United States Patent Office 3,563,986
Patented Feb. 16, 1971

3,563,986
4 - PHTHALIMIDO - N - HETEROCYCLIC AMINO METHYL OR PIPERIDINO HYDRAZINO PIPERIDINE DIONES 2,6
Ernst Frankus, Dorfstrasse 14, Schleckheim, near Aachen, Germany; Heinrich Mueckter, Eupener Str. 291, Aachen, Germany; and Siegfried Herrling, Auf der Liester 8; Franz Otto, Galmeistrasse 57; and Horst Boehlke, Trockener Weiher 33, all of Stolberg, Rhineland, Germany
No Drawing. Filed May 9, 1966, Ser. No. 548,426
Claims priority, application Germany, Oct. 12, 1965, P 15 45 706.4; Oct. 13, 1965, P 15 45 707.5; Austria, Oct. 15, 1965, A 9,341/65
Int. Cl. C07d 87/46
U.S. Cl. 260—247.1   8 Claims

ABSTRACT OF THE DISCLOSURE

Dicarboxylic acid imides which carry in 4-position of their ring structure an acylated amino or imino group and are substituted at the imido group by basically substituted methyl have valuable pharmacological properties, such as anti-tumor, immuno-suppressive, and sedative properties. Examples of such compounds are 4-phthalimido piperidinediones-2,6 substituted in 1-position by a morpholino, piperidino, or pyrrolidino methyl group or by an N-methyl-N-morpholino or N-methyl-N-piperidino amino methyl group; 4-(3′,5′-dithia-3′,4′,5′,6′-tetrahydrophthalimido) piperidinedione-2,6 substituted in 1-position by a morpholino, piperidino, or pyrrolidino methyl group, and others.

The present invention relates to new and valuable dicarboxylic acid imides, and more particularly to dicarboxylic acid imides which have a dicarboxylic acid imido or a sulfo carboxylic acid imido group attached to one of the carbon atoms of the dicarboxylic acid imide and which carry a basic substituent at the imido nitrogen atom, to a process of making such compounds, and to a method of using them in therapy.

It is one object of the present invention to provide such new and valuable dicarboxylic acid imides.

Another object of the present invention is to provide a simple and effective method of producing such dicarboxylic acid imides.

A further object of the present invention is to provide a valuable and highly effective pharmaceutical composition containing such dicarboxylic acid imides.

Still another object of the present invention is to provide a method of using such dicarboxylic acid imides in therapy.

Other objects of the present invention and advantageous features thereof will become apparent as the description proceeds.

In principle the dicarboxylic acid imides according to the present invention correspond to the following Formula I

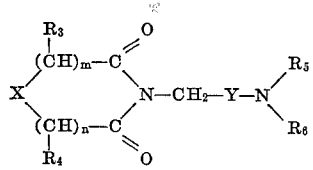   I

In said Formula I X represents one of the groups

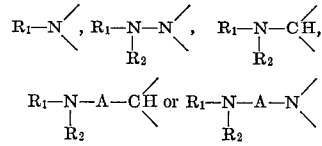

wherein $R_1$ indicates an organic carboxylic or sulfonic acid group or a urea or thiourea residue;
$R_2$ represents hydrogen or alkyl, aryl, aralkyl, cycloalkyl, or a heterocyclic ring which may be substituted, or the group

represents a five- or six-membered heterocyclic ring which may be connected with further ring systems or substituents and in which the nitrogen atom bearing the radicals $R_1$ and $R_2$ is the member of a

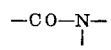

or a

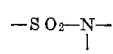

group, especially of a

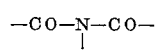

group and wherein

A represents a lower alkylene radical,
$R_3$ and $R_4$ indicate the same or different substituents and are members of the group consisting of hydrogen, lower alkyl, aryl, and aralkyl,
$m$ and $n$ represent equal or different numerals, namely 1 or 2, whereby the sum of $m$ and $n$ is 2 or 3,
Y represents a single bond or the group $>N—R_7$, wherein $R_7$ indicates a member of the group consisting of lower alkyl, aryl, aralkyl and heterocyclic radicals which may be substituted;
$R_5$ and $R_6$ indicate the same or different substituents and are lower alkyl, aralkyl, aryl, cycloalkyl, heteroalkyl, or a heterocyclic ring which may be substituted, or $R_5$ and $R_6$ together with the nitrogen atom to which they are attached form a five- or six-membered heterocyclic ring which may contain oxygen, sulfur, or nitrogen as a further hetero-atom and which may also be substituted.

In Formula I X preferably represents the group

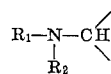

wherein $R_1—N—$
$\phantom{R_1—N}|$
$\phantom{R_1—N—}R_2$ especially represents an aliphatic, cycloaliphatic, heterocyclic, or aromatic dicarboxylic acid imido group or an imido group of a dicarboxylic acid, the first carboxyl group of which is bound to an aromatic or heterocyclic ring system consisting of one or more rings and the second carboxyl group of which is bound to an aliphatic radical in neighboring position to the first carboxyl group, these dicarboxylic acid imido groups being attached to the cyclic imide by their imido nitrogen atom. Such dicarboxylic acid imides may be the imides of succinic acid, phthalic acid, cylopentane- or cyclohexane-1,2-dicarboxylic acid, fluorene - 9,9 - diacetic acid, naphthalene-1,2-, -2,3-, or -1,8-dicarboxylic acid, pyridine-2,3- or -3,4-dicarboxylic acid, imidazole or thiazole-4,5-dicarboxylic acid, benzimidazole-4,5- or -5,6-dicarboxylic acid, quinoline-2,3-, -3,4-, -4,5-, -5,6-, -6,7-, or -7,8- dicarboxylic acid quinoxaline-2,3-dicarboxylic acid thiophene- or furane-2,3- or -3,4-dicarboxylic acid, benzodioxane-2,3-dicarboxylic acid, 3,6-dithia-3,4,5,6-tetrahydrophthalic acid, 3,6-dithia-3,6-dihydrophthalic acid, 3,5 - dithiacyclopentane-1,2-dicarboxylic acid, o-sulfo benzoic acid, o-carboxymethylbenzoic acid, homophthalic acid, 2- or 4-carboxymethylnicotinic acid as well as the imides of substituted dicarboxylic acids of this type and their hydrogenated or dehydrogenated derivatives.

$R_5$ and/or $R_6$ in said Formula I may be substituted, for instance, by alkyl and/or aryl, hydroxyl or mercapto groups which may be esterified or etherified, tertiary amino groups, carboxyl or carbalkoxy groups, or halogen. If $R_5$ and $R_6$ represent heterocyclic radicals, they may be, for instance, N-alkyl piperidyl-4 radicals. $R_5$ and $R_6$, together with the nitrogen atom to which they are attached, may form a heterocyclic ring, such as the pyrrolidine, piperidine, morpholine, thiomorpholine ring or a piperazine ring which may be substituted in 4-position for instance, the 4-methyl-, 4-benzyl-, 4-($\beta$-hydroxy ethyl)-, 4-acetyl piperazine ring and other similar substituted piperazine rings.

The compounds of the general Formula I may contain at least one asymmetrically substituted carbon atom and, therefore, may exist in isomeric forms. Within the scope of the present invention are not only the racemic forms of the compounds of Formula I or mixtures of their isomers, respectively, but also the pure isomers, for instance, the optically active forms of the compounds of Formula I, and the manufacture of these different forms of the compounds of Formula I.

The new cyclic imides according to the present invention exhibit highly valuable and noteworthy activities which permit their application in therapy. The new compounds have a marked anti-tumor activity as could be demonstrated by using the following test method.

If female Sprague-Dawley (SD) rats between 50 and 65 days old with a mean weight of 160 g. are given a single dose of 20 mg. of 7,12-dimethylbenzanthracene in 1 ml. of sesame oil through a stomach tube, there occur in the region of the milk ridge tumors the number of which is counted and the size or area of which is measured. Treatment of animals in which mammary tumors were induced in the described manner, with compounds of Formula I results in a noteworthy decrease of the number and size or area of the tumors in comparison to the tumor number and size or area in untreated control animals. The size or area of the tumor was calculated in sq. mm. as the product of the largest and smallest diameters of the tumor ascertainable percutaneously. Starting, for instance, with an average size of 437.2 sq. mm. in 10 animals, the tumor size in untreated animals increases in four weeks to a size of 1,282.6 sq. mm. and the number of tumors increases from 2.4 to 4.6 (mean values from 10 animals).

If the animals were given a feed containing 1.37% of 4-phthalimido-N-(morpholino methyl) glutaric acid imide (1-(morpholino methyl)-4-phthalimido piperidinedione-2,6), the compound of the following Example 1, for four weeks, the tumor size or area decreases within said period of time from 448.2 sq. mm. to 63.2 sq. mm. and the tumor number decreases from 2.2 to 1.3. These values are mean values from 10 animals. Thus administration of the compounds according to the present invention not only reduces the tumor area considerably but also decreases the number of tumors caused by administration of the carcinogenic agent.

Similar results are obtained with other compounds according to the present invention. The following table illustrates the results obtained on a treatment of groups of 10 female Sprague-Dawley rats with each of the following compounds for four weeks in the amounts given.

TABLE

| Compound of example number | Amount in feed, percent | Starting tumor Area, sq. mm. | Number | Tumor after 4 weeks Area, sq. mm. | Number |
|---|---|---|---|---|---|
| Control | | 437.2 | 2.4 | 1,282.6 | 4.6 |
| 1 | 1.37 | 448.2 | 2.2 | 63.2 | 1.3 |
| 2 | 1.49 | 406.8 | 3.0 | 51.0 | 1.3 |
| 3 | 1.37 | 420.4 | 2.5 | 32.7 | 0.8 |
| 4 | 1.32 | 429.8 | 2.6 | 57.3 | 1.2 |

Moreover the new compounds of the general Formula I show a favourable effect on survival of transplanted tissue, i.e. living particles of tissue transplanted from one organism to another. This effect was tested in Sprague-Dawley rats in which skin grafts were transplanted to animals of the same species. The animals were inspected whether or when, respectively, the grafts were rejected after transplantation. In untreated animals 9 days after the transplantation only 8% of the grafts were free of necroses. If, however, the animals had been fed for a period of five days before transplantation with a feed containing 1.49% of 1 - (N-methyl-N-morpholino)-aminomethyl-4-phthalimidopiperidinedione-2,6 (racemic form) 56% of the grafts remained free of necroses on the 9th day after transplantation.

These immunosuppressive properties may be also an explanation for the fact that by the compounds of the general Formula I leprous diseases as well as damages caused by X-ray and autoimmune diseases may be influenced favourably.

Administration of compounds of the general Formula I influences on the endocrine system (endocrinopathies).

Moreover many of the compounds of Formula I could be shown to have a marked sedative effect.

The new valuable compounds of Formula I may be prepared by reacting a cyclic imide of Formula II

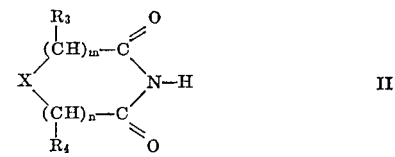

wherein X, $R_3$, $R_4$, $m$, and $n$ represent the same substituents and numerals as indicated herein above with a compound of Formula III

wherein $R_5$, $R_6$ and Y represent the same substituents as indicated above, or with an acid addition salt of a compound of Formula III, in the presence of formaldehyde. Preferably the formaldehyde is used in the form of its aqueous or alcoholic solution. In place of formaldehyde there may be used compounds which are capable of forming formaldehyde under the reaction conditions, for instance, paraformaldehyde or chloromethyl methyl ether. It is advisable to carry out the reaction in the presence of solvents or diluents. Preferably there are used organic solvents such as methanol, ethanol, $\beta$-ethoxy ethyl alcohol, dioxane, or mixtures of water and organic solvents. The reaction is preferably carried out at elevated temperature, for instance, at a temperature between 50° C. and 80° C. However, it is also possible to work at room temperature or with cooling. There may be used stoichiometric amounts of the compounds of Formulas II and III and of formaldehyde. It is, however, also possible to use an excess of one or two of the three reactants.

The compounds of Formula I may be isolated by adding to the reaction mixture a liquid in which the reaction products are insoluble or at least poorly soluble. Thus in isolating compounds which are poorly soluble, for instance, in alcohol, from a mixture of water and alcohol, alcohol is added to said mixture to cause precipitation of the reaction product.

The compounds according to this invention may also be isolated by cooling the reaction mixture to cause crystallization of the reaction products. Preferably the reaction mixture is concentrated before cooling.

The solvent or diluent may also be removed by distillation and the resulting residue may then be recrystallized from suitable solvents or mixtures of solvents.

If desired, the resulting compounds of Formula I are converted into their acid addition salts by reaction with suitable acids if the compounds of Formula III have not been used in the form of their salts.

The compounds of Formula I may also be prepared by reacting a compound of Formula IV

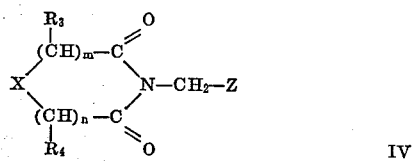

wherein X, $R_3$, $R_4$, $m$ and $n$ represent the same substituents and numerals as mentioned herein above and wherein Z represents hydroxyl, an esterified hydroxyl group, or halogen, with a compound of Formula III. This reaction may be carried out in the presence of an organic solvent and, if required, with azeotropical removal of the compound H-Z formed during the reaction.

Furthermore, the compounds of Formula I can be obtained by reacting a compound of Formula II with a compound of Formula V

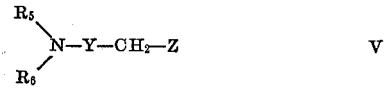

wherein $R_5$, $R_6$, Y and Z represent the same substituents as indicated herein above.

This reaction is also preferably carried out in the presence of an organic solvent and, if required, with azeotropical removal of the compound H-Z formed during the reaction.

The compounds of Formula I obtained in the manner described before may, if desired, be converted into their acid addition salts by reaction with inorganic or organic acids. Conversion into the salts, however, is not required since the reaction products as such can be used therapeutically.

In the manufacture of the compounds of Formula I in their optically active forms it is possible to proceed as described hereinbefore, but using the respective optically active starting materials. The compounds of Formula I may also be prepared in their racemic form and may be resolved into their optically active forms in a manner known per se.

The starting materials of Formulas II, IV, and V are obtained in a manner known per se.

The following examples serve to furthre illustrate the present invention. All melting points data are uncorrected.

EXAMPLE 1

50 g. of 4-phthalimido piperidinedione-2,6 are dissolved in 250 ml. of ethyleneglycol mono-ethyl ether and refluxed. 150 ml. of a solution of formaldehyde in water containing 30% of formaldehyde are added dropwise thereto followed by the addition of 60 ml. of morpholine. The reaction mixture is refluxed for some time. On cooling 48 g. of 1-morpholino methyl-4-phthalimido piperidinedione-2,6 are obtained. M.P. 203–205° C. (with decomposition) on recrystallization from dioxane/ether.

EXAMPLE 2

5.2 g. of 4 - phthalimido-piperidinedione-2,6 are suspended in 40 ml. of ethyleneglycolmoonethylether and heated at 100° C. 10 ml. of a solution of formaldehyde in water, containing 30% of formaldehyde are added dropwise, thereto followed by the addition of 6.6 g. of N-methylamino-piperidine. The solvent of the—if necessary after filtration—clear solution is distilled off under reduced pressure. The residue is dissolved in dioxane. Adding ether the 1-(N-methyl-N-piperidino) aminomethyl-4 phthalimido-piperidinedione-2,6, M.P. 124–136° C., (dec.) is obtained.

EXAMPLE 3

50 g. of 4-phthalimido piperidinedione-2,6 and 7 g. of paraformaldehyde are suspended in 200 ml. of absolute dioxane and the mixture is refluxed. 17 g. of piperidine are added dropwise thereto. The reaction mixture is filtered, if necessary. 1-piperidino methyl-4-phthalimido piperidinedione-2,6 is obtained by cooling the resulting clear solution. M.P. 132–136° C. (with decomposition) on recrystallization from toluene/petroleum ether.

EXAMPLE 4

50 g. of 4-phthalimido piperidinedione-2,6 are suspended in 500 ml. of absolute dioxane. While heating, a solution of 100 g. of N-methylol pyrrolidine in 100 ml. of absolute dioxane is added dropwise thereto. On cooling 1-pyrrolidino methyl-4-phthalimido piperidinedione-2,6 is obtained. M.P. 159–162° C. (with decomposition) on recrystallization from dioxane/ether.

EXAMPLE 5

Following the procedure of Example 2 the 1-(N-methyl-N-morpholino) - aminomethyl - 4 - phthalimido-piperidinedione-2,6, M.P. 160–165° μ.dec. is obtained from 4-phthalimido-piperidine-dione-2,6 and N-methylamino-morpholine.

EXAMPLE 6

5.2 g. of 4-phthalimido-piperidinedione-2,6 are suspended in 70 ml. of trichloromethane. While stirring 4.2 g. of N,N,N'-trimethyl-N'-hydroxymethyl-hydrazine are added dropwise. The reaction mixture is heated to 100° for 30 minutes. The solvent of the—if necessary after filtration—clear solution is distilled off under reduced pressure. The residue is dissolved in toluene. Adding ether the 1-(N-methyl - N - dimethylamino)aminomethyl-4-phthalimido-piperidinedione-2,6, M.P. 109–118° C. is obtained. Yield 53% of the theoretical one.

EXAMPLE 7

50 g. of 4-(3',6'-dithia-3',4',5',6'-tetrahydrophthalimido) piperidinedione-2,6 are refluxed with 300 ml. of ethylene glycol mono-ethyl ether. While stirring, 80 g. of N-methylol morpholine are added dropwise thereto. On cooling, 1 - morpholino methyl-4-(3',6'-dithia-3',4',5',6'-tetrahydrophthalimido) piperidinedione-2,6 precipitates in yellow crystals, M.P. 192–195° C. (with decomposition). Yield: 75% of the theoretical yield.

EXAMPLE 8

Following the procedure as described in example 7, 1-piperidino methyl-4-(3',6'-dithia-3',4',5',6' - tetrahydrophthalimido) piperidinedione-2,6 is obtained in yellow crystals, M.P. 161–162° C. (with decomposition), by using 80 g. of N-methylol piperidine, in place of N-methylol morpholine. Yield: 80% of the theoretical yield.

EXAMPLE 9

50 g. of 4 - (3',6'-dithia-3',4',5',6'-tetrahydrophthalimido) piperidinedione-2,6 are suspended in 500 ml. of absolute dioxane and heated to 50° C. While stirring, 80 g. of N-methylol pyrrolidine dissolved in 200 ml. of absolute dioxane are added dropwise thereto. 1-pyrrolidino methyl - 4-(3',6'-dithia-3',4',5',6'-tetrahydrophthalimido) piperidinedione-2,6 precipitates, on standing, from the clear reaction solution which may have been clarified by filtration, if necessary. Yellow crystals, M.P. 153° C. with decomposition.

The starting material, the 4-(3',6'-dithia-3',4',5',6'-tetrahydrophthalimido) piperidinedione-2,6 is obtained in the following manner:

75 g. of β-amino-glutaric acid and 95 g. of 3,6-dithia-3,4,5,6-tetrahydrophthalic acid anhydride are suspended in 750 ml. of pyridine and refluxed for 7 hours. The reaction mixture is filtered, if necessary. The solvent is distilled off under reduced pressure from the resulting clear solution. The residue is refluxed with the addition of 500 ml. of acetic acid anhydride for 10 minutes. On cooling, β-(3,6-dithia-3,4,5,6 - tetrahydrophthalyl) glutamic acid anhydride precipitates in yellow crystals, M.P. 230° C. (with decomposition).

90 g. of said compound are refluxed with 700 ml. of dioxane. While stirring vigorously, dry ammonia gas is introduced until a filtered part of the reaction mixture does no more precipitate on introducing dry ammonia gas. The solvent is poured off and the residue is dissolved with water. On adding 18% hydrochloric acid, β-(3,6-dithia-3,4,5,6-tetrahydrophthalyl) glutamine precipitates, M.P. 141–144° C.

100 g. of said compound are refluxed with a mixture of 600 ml. of acetic acid anhydride and 50 ml. of thionylchloride for one to one and a half hours. 4-(3',6'-dithia-3',4',5',6' - tetrahydrophthalimido) piperidinedione - 2,6 precipitates on standing. M.P. 266–274° C. (with decomposition).

In place of the cyclic imides used in the preceding examples as the one reactant, there may be employed other cyclic imides as mentioned hereinabove and, in addition thereto, cyclic imides in which X is $R_8$—C whereby $R_8$ is a substituted or unsubstituted heterocyclic group such as the hydantoin, thiazolidine-2,4-dione, 1,3-thiazine-2,4-dione, 2,4-dioxo pyrimidine, or similar heterocyclic groups. The dicarboxylic acid imides attached to the cyclic imide when X is

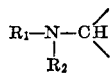

may, of course, be substituted, for instance, by halogen, the nitro group, amino groups, lower alkoxy, phenyloxy, naphthyloxy, benzyloxy, phenyl ethoxy, lower alkyl, and other substituents.

Likewise, in place of morpholine, piperidine, and pyrrolidine, used in the preceding examples as the other reactant, there may be employed primary and secondary amino compounds, such as lower alkylamines, like dimethylamine, β,β-dichloro diethylamine and others, lower alkanolamines, aniline, toluidines, benzylamine, phenyl ethylamine, halogen or lower alkyl substituted anilines, naphthylamines, or thiomorpholine and other five- or six-membered heterocyclic compounds with a reactive hydrogen atom attached to a ring-nitrogen atom, or C-substituted heterocyclic compounds such as the lower alkyl substituted morpholines, piperidines, pyrrolidines, piperazines, or N-methyl or other N-lower alkyl, N-benzyl, N-(β-hydroxy ethyl), N-carbethoxy, N-acetyl, or N-lower alkanoyl piperizines, while otherwise the procedure is the same as described in said examples.

The acid addition salts of the compounds according to the present invention are obtained in a manner known per se by reaction with inorganic or organic acids.

As stated above, the new compounds have noteworthy effects upon tumors as they are induced in Sprague-Dawley rats, for instance, by 7,12-dimethyl benz(a)-anthracene. Such tumors respond to prophylactic administration of the new compounds as well as to a therapeutic treatment therewith. Under prophylactic administration they delay the appearance and growth of 7,12-dimethyl benzanthracene-induced tumors. Apparently the mechanism of the antitumor-activity of the new compounds differs from that of known cytostatic agents.

Preferably the new imide compounds according to the present invention or their pharmaceutically acceptable acid addition salts are administered perorally in a pharmaceutical carrier in standard form as tablets, pills, lozenges, dragées and the like shaped and/or compressed preparations. It is also possible to produce emulsions or suspensions of said compounds in water or aqueous media such as unsweetened fruit juices and by means of suitable emulsifying or dispersing agents. The new antitumor agents may furthermore be employed in the form of powders filled into gelatin capsules or the like.

Such powders and mixtures to be used in the preparation of tablets and other shaped and/or compressed preparations may be diluted by mixing and milling with a solid pulverulent extending agent to the desired degree or fineness or by impregnating the already milled, finely powdered, solid carrier with a suspension of the new imide compounds in water or with a solution thereof in an organic solvent and then removing the water or solvent.

When preparing tablets, pills, dragées, and the like shaped and/or compressed preparations, the commonly used diluting, binding, and disintegrating agents, lubricants, and other tableting adjuvants are employed, provided they are compatible with the new imide compounds. Such diluting agents and other excipients are, for instance, sugar, lactose, levulose, starch, bolus alba, as disintegrating and binding agents gelatin, gum arabic, yeast extract, agar, tragacanth, methyl cellulose, pectin, and as lubricants stearic acid, talc, magnesium stearate, and others.

It is, of course, also possible to administer the new imide compounds in the form of suppositories, whereby the commonly used suppository vehicles, such as cocoa butter are used.

The new compounds may also be administered parenterally whereby aqueous solutions of water-soluble compounds or suspensions may be used.

They also exhibit immuno-suppressive properties as proved by their favorable effect on the survival of transplanted tissue, i.e. living particles of tissue transplanted from one organism to another. Their immuno-suppressive properties may explain the fact that treatment with compounds of Formula I favorably affects leprosy as well as damages caused by X-rays and auto-immune diseases.

Administration of compounds of Formula I has also a marked effect on the endocrine system and thus permits their use in the treatment of endocurino pathies.

Furthermore, many compounds of Formula I have a pronounced sedative effect and can be used therapeutically for said purpose.

We claim:
1. A dicarboxylic acid imide of the formula

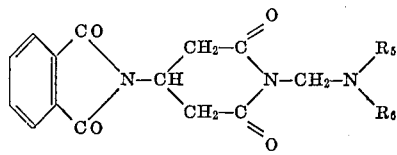

wherein $R_5$ and $R_6$ taken together with the nitrogen atom form morpholino, piperidino or pyrrolidino, or $R_5$ is lower alkyl of 1 to 4 carbon atoms and $R_6$ is piperidino or the pharmaceutically acceptable acid addition salts of said imide.

2. 1-(N-methyl - N - morpholino) - aminomethyl - 4-phthalimido piperidinedione-2,6.

3. 1-(N-methyl - N - dimethylamino)-aminomethyl-4-phthalimido piperidinedione-2,6.

4. 1-morpholino methyl - 4 - (3',6' - dithia - 2',4',5',6'-tetrahydrophthalimido) piperidinedione-2,6.

5. 1-morpholino methyl - 4 - phthalimido piperidinedione-2,6.

6. 1-(N - methyl - N - piperidino) - aminomethyl-4-phthalimido piperidione-2,6.

7. 1-piperidino methyl - 4 - phthalimido piperidinedione-2,6.

8. 1-pyrrolidino methyl - 4 - phthalimido piperidinedone-2,6.

References Cited

Rosnati et al., Chemical Abstracts, vol. 62, p. 13082f (1965).

ALEX MAZEL, Primary Examiner

J. TOVAR, Assistant Examiner

U.S. Cl. X.R.

260—247.2, 281; 424—248, 267